United States Patent Office 2,900,266
Patented Aug. 18, 1959

2,900,266
METHOD OF INCREASING FLUIDITY OF AQUEOUS INDUSTRIAL MINERAL SLURRIES

Kenneth J. Shaver, Stoneham, Mass., assignor to Monsanto Chemical Company, St. Louis, Mo., a corporation of Delaware No Drawing. Application February 18, 1957
Serial No. 640,626

19 Claims. (Cl. 106—100)

This invention relates to the method of increasing the fluidity of aqueous industrial mineral slurries, wherein a small amount of an alkali metal polyphosphatosulfate is added thereto to provide a means of handling more concentrated slurries without material change in the processing equipment.

Various industrial aqueous slurries which can be deflocculated by the addition of a small amount of a sodium polyphosphatosulfate are raw cement slurries; various clay slurries; suspensions of various pigments such as barium sulfate, titanium dioxide, zinc oxide, ferric oxide, etc.; various mineral-based paper-coating compositions, especially for high-speed coating processes; and the like.

The present and future large demand for cement compositions to provide materials of construction for highways; industrial, commercial, and residential buildings; bridges; waterways; and numerous other classes of construction, has imposed a substantial burden on the cement production industry. However, plant expansion is very expensive in the cement industry and it is therefore necessary to improve the efficiency of existing equipment by all suitable means.

A substantial quantity of the total U.S. cement production is produced in wet-process plants wherein the raw argillaceous and calcareous materials are mixed in the desired proportions and ground in water suspension to provide a uniform quality blended slurry which can be easily modified, if necessary, by the addition of various suitable slurries of the argillaceous or calcareous materials such that the final slurry composition will conform to rigid chemical composition specification limits. The uniform slurry is then pumped to the rotary kilns via a surge storage area. The water content of the slurry must be maintained at a sufficiently high level to insure the maintainenance of the slurry in a pumpable condition to preclude plugging of the lines, etc. Accordingly, any reduction of the water content which can be made without danger of producing a non-pumpable slurry is necessary for efficient operation of the process.

It is known that various alkali metal phosphates, such as sodium hexametaphosphate, tetrasodium pyrophosphate, sodium tripolyphosphate, sodium tetrapolyphosphate, and the like, functioning as deflocculants have permitted a substantial reduction in water content of various raw cement slurries. It is often necessary to employ sodium carbonate with the alkali metal phosphate to provide the necessary reduction of water content. However, it is essential that the total amount of sodium-containing compounds added to the cement slurry be held to a minimum to preclude exceeding the low $Na_2O$ tolerance limit for the finished cement.

It has also been found that the polyphosphate cannot be economically employed with raw cement slurries that contain a relatively high soluble cation concentration. Thus, for example, slurries containing about 300 to 400 parts soluble calcium, or magnesium, per million parts of solid appear to be about the maximum slurry composition that can be treated economically with a polyphosphate. The soluble salts use a portion of the polyphosphate in sequestration of said salts before it is effective to deflocculate the slurry whereby additional polyphosphate is required to effect the desired deflocculation.

It is the principal object of this invention to provide a novel process of deflocculating aqueous industrial mineral slurries whereby substantially increased solids-content compositions possess comparable viscosity characteristics to a lower solids-content untreated slurry, or if the solids content of the slurry remains substantially constant the treated slurry has a materially lower viscosity than the untreated slurry. It is a further object of this invention to provide a process for the treatment of raw cement slurries whereby said slurries have an increased solids content at a given pumpable viscosity, thereby reducing the fuel costs required for calcination and simultaneously increasing the production capacity of the plant without requiring capital investment for costly additional equipment. Another object of this invention is to provide an improved process for the treatment of raw cement slurries which at present cannot employ the polyphosphates and other deflocculants economically due to the limitations of the raw rock and/or process water which is high in soluble cations, as for example calcium and magnesium. A still further object is to provide an improved process for the treatment of raw cement slurries whereby said slurries can be effectively treated over a wide range of pH values and the deflocculated slurries exhibit an improved ability to remain suspended with a minimum of agitation.

It has now been found that the alkali metal polyphosphatosulfates are particularly useful as a deflocculating agent in the treatment of aqueous industrial mineral slurries. The polyphosphatosulfates are about comparable to the polyphosphates, for example sodium tripolyphosphate, when used to treat raw cement slurries which are relatively low in soluble cations, e.g., calcium and the like. However, the polyphosphatosulfates have been shown to have certain beneficial properties which are of particular significance in the treatment of various classes of industrial slurries. Thus, as hereinafter more fully pointed out the polyphosphatosulfate is substantially more effective than the polyphosphate in the treatment of industrial slurries containing high soluble cations, e.g., calcium; is effective at low pH values and thereby does not require the addition of sodium carbonate or other alkaline material to adjust the pH of the slurries as is necessary with the polyphosphate, accordingly the polyphosphatosulfate is particularly useful with acid slurries; and the polyphosphatosulfate-deflocculated slurries are characterized by an improved ability to remain suspended with a minimum of agitation.

For most purposes the quantity of the sodium polyphosphatosulfate necessary to effect the desired deflocculation of the specific industrial slurry has been found to range from about 0.005 to about 0.5 percent and preferably from about 0.05 to about 0.2 percent, based on the solids content of said slurry, but large quantities can be employed as necessary for special effects.

The alkali metal polyphosphatosulfates can be prepared by several related methods all of which embrace the treatment of a mixture selected from the group consisting of alkali metal phosphates, alkali metal sulfates and the acid anhydrides, phosphorus pentoxide and sulfur trioxide, in accordance with the requirement that the ratio of $x$ to $y$ plus $z$ is less than one in the formula $xM_2O \cdot yP_2O_5 \cdot zSO_3$, wherein M is an alkali metal, as disclosed and claimed in my copending application Serial No. 622,261, filed November 15, 1956, of which the instant application is a continuation in part. After the reaction mixture is heated to the melting point the melt is rapidly cooled to provide a glassy product which can be readily sized by any suitable means as required by the end use of the particular product.

One suitable method for the preparation of the polyphosphatosulfates entailed heating the selected phosphate salt, e.g. sodium tripolyphosphate, tetrasodium pyrophosphate and the like, to about 100° C. and treating the said salt with gaseous anhydrous sulfur trioxide in a closed system whereby the gaseous sulfur trioxide is absorbed by the salt. The exothermic heat of reaction is normally sufficient to cause the mixture to melt where heat losses are substantially avoided. In the event that the processing conditions prevent a sufficient build-up of temperature in this manner the mixture is brought to a clear, free-flowing melt at about 400° to about 450° C. by providing heat from an external source. The melt is then chill-cooled and solidifies to a clear glass.

The aforesaid use of gaseous sulfur trioxide is not easily controlled as to the extent of the sulfur trioxide which is absorbed into the phosphate salt. A substantially accurate control of the addition of the sulfur trioxide can be effected by the use of anhydrous liquid sulfur trioxide wherein it is added slowly directly to the dry phosphate salt in a closed and vented vessel at a temperature of from about 25° C. to about 50° C. or higher, but less than 100° C., with constant agitation to produce a dry, free-flowing composition which is then heated to its melting point of above about 400° C. and subsequently chill-cooled.

The aforesaid method of preparation of polyphosphatosulfate compositions also suffers from several limitations in that the dry powder fumes strongly when large amounts of sulfur trioxide are added and this system is not adaptable to vary the $Na_2O:P_2O_5$ ratio which is fixed by the particular choice of phosphate salt employed. These limitations can be removed by the use of a suitable mixture of phosphate and sulfate salts to which phosphorus pentoxide is added to provide the ultimate desired ratio of $Na_2O:P_2O_5:SO_3$. The three-component system can be readily prepared to provide a uniform, dry mixture which is then heated to the melting point and chill-cooled to provide the polyphosphatosulfate compositions.

In addition various mixtures of phosphate and sulfate salts can be selected wherein the $M_2O:(P_2O_5+SO_3)$ molecular ratio will be less than one, e.g. sodium monohydrogen phosphate or sodium dihydrogen phosphate with sodium bisulfate, which on fusion of the dehydrated mixture gives a melt providing a polyphosphatosulfate composition when solidified.

All of the products having the same $Na_2O:P_2O_5:SO_3$ ratio are equivalent regardless of the specific phosphates, sulfates, or the acid anhydrides, phosphorus pentoxide or sulfur trioxide, which are employed to effect this ratio. Accordingly, it is apparent that a specific alkali metal polyphosphatosulfate composition can be prepared by the combination of various reactants pursuant to the aforesaid disclosure.

Suitable illustrative materials which can be employed to provide the necessary reactants, selected such that the ultimate molecular ratio of the $M_2O$ to the sum of the $P_2O_5$ and $SO_3$ is less than one, are: alkali metal monoxides, such as sodium monoxide and potassium monoxide; phosphorus pentoxide in all forms, the O-form polymeric material being preferred for reactions carried out in open vessels at atmospheric pressure; sulfur trioxide in all forms, but extra care must be employed in the use of $\alpha$-$SO_3$ since the melting of this stable form is accompanied by an almost explosive increase in vapor pressure, thus the $\gamma$-form is generally preferred, alkali metal sulfates such as sodium sulfate, potassium sulfate, sodium bisulfate, and potassium bisulfate; and alkali metal phosphates, such as trisodium orthophosphate, sodium monohydrogen orthophosphate, sodium dihydrogen orthophosphate, tetrasodium pyrophosphate, disodium dihydrogen pyrophosphate, sodium tripolyphosphate, sodium tetrapolyphosphate, the various sodium metaphosphates, and the like, and the corresponding potassium salts.

The following examples are illustrative of the instant invention.

Example 1

The sodium polyphosphatosulfate compositions are effective deflocculation agents for the treatment of wet-process raw cement slurries as demonstrated by the following experimental comparison. A sample of high-calcium ion content wet-process raw cement slurry was obtained from a commercial source. This slurry contained about 64 percent total solids and had a viscosity which required a force of 117 gm. to give a spindle speed of 300 r.p.m. in a Stormer viscosimeter. Two duplicate samples of raw cement slurry were treated by the incorporation therein of 0.10 percent by weight of the slurry dry solids of sodium tripolyphosphate and the sodium polyphosphatosulfate composition obtained by the fusion reaction of a mixture having the composition $5Na_2O:3P_2O_5:3SO_3$, respectively to each of the two samples. The viscosity of the treated samples was redetermined in the same manner as indicated above and it was found that the force necessary to provide a spindle speed of 300 r.p.m. was respectively reduced to 115 gm. and 88 gm., i.e. a 1.7 percent reduction for the raw cement slurry containing the sodium tripolyphosphate and a 24.8 percent reduction for the raw cement slurry containing the sodium polyphosphatosulfate composition. It is apparent that the sodium polyphosphatosulfate is a particularly effective deflocculating agent for raw cement slurries which contain substantial concentrations of polyvalent metal ions such as calcium. It is noted that the sodium tripolyphosphate effects very little viscosity reduction in this raw cement slurry system at this level of application. It was found that to effect a substantially similar reduction in viscosity to that obtained with 0.10 percent of the sodium polyphosphatosulfate required about 0.26 percent of the sodium tripolyphosphate.

Example 2

A similar comparison was made between the sodium tripolyphosphate and sodium polyphosphatosulfate composition ($5Na_2O:3P_2O_5:3SO_3$) of Example 1, wherein a low-calcium-ion content raw cement slurry containing about 59 percent total solids was treated with the aforesaid deflocculants. The initial slurry required 54 gm. weight to give a spindle speed of 300 r.p.m. in a Stormer viscosimeter, which was reduced to 35 and 33 gm., respectively, by the addition of 0.05 percent by weight of the slurry dry solids of sodium tripolyphosphate and the sodium polyphosphatosulfate.

Example 3

A kaolin slurry containing 50 percent solids on a dry basis was prepared and 0.08 percent of calcium was added thereto as calcium chloride. Duplicate samples of this slurry were then deflocculated with 0.23 percent by weight of the slurry solids of sodium tripolyphosphate and sodium polyphosphatosulfate ($4Na_2O:3P_2O_5:2SO_3$) and the weight necessary to give a Stormer viscosimeter spindle speed of 300 r.p.m. determined to be 360 gm. and 255 gm. respectively demonstrating the materially reduced apparent viscosity for the sample deflocculated with the sodium polyphosphatosulfate.

Example 4

Aliquot portions of the kaolin slurry of Example 3 were treated with 0.3 percent of the defocculant compositions listed below and the weight necessary to give a Stormer viscosimeter spindle speed of 300 r.p.m. determined to be as indicated.

| Deflocculant | Weight in gms. |
|---|---|
| Graham's Salt | 520 |
| Sodium polyphosphatosulfates: | |
| $4Na_2O:3P_2O_5:3SO_3$ | 250 |
| $4Na_2O:3P_2O_5:2SO_3$ | 238 |
| $6Na_2O:3P_2O_5:4SO_3$ | 255 |
| $3.3Na_2O:3P_2O_5:1SO_3$ | 260 |

Example 5

A purified sodium kaolin slurry containing 60 percent solids on a dry basis was prepared and 0.25 percent calcium chloride was added thereto. The initial apparent viscosity of this slurry was about 1200 gm. for a Stormer viscosimeter spindle speed of 300 r.p.m. The addition of 0.1 percent by weight of sodium tripolyphosphate and sodium polyphosphatosulfate $$(4Na_2O:3P_2O_5:2SO_3)$$

to duplicate samples of the slurry reduced the weight necessary to effect a spindle speed of 300 r.p.m. to 1040 gm. and 800 gm., respectively.

Example 6

Two identical slurries of Georgia kaolin containing 50 percent solids were deflocculated respectively with equal weights of sodium tripolyphosphate and sodium polyphosphatosulfate having the composition $$4Na_2O:3P_2O_5:2SO_3$$

in the amount of 0.2 percent based on the slurry solids. The slurry treated with sodium tripolyphosphate settled in a matter of minutes and after a week consisted of a hard-packed cake. Then the settled cake was resuspended and the filtration characteristics of the slurry were compared with the original undeflocculated slurry. It was found that the resuspended sodium tripolyphosphate deflocculated slurry could not be filtered under the conditions of this experiment. In contradistinction thereto the slurry deflocculated with sodium polyphosphatosulfate showed no evidence of settling during the one-week storage period and this slurry was filterable in substantially the same manner as the original untreated slurry.

Example 7

As a more direct measure of the relative chelation capacity of the sodium polyphosphatosulfate compositions the quantity of calcium ion necessary to cause turbidity in given samples was determined. The material to be tested was dissolved in distilled water (50 mg. sample/about 75 ml. of water) and adjusted to pH 8. Then a 0.2 M solution of calcium chloride was added thereto from a buret and the first appearance of turbidity detected with the aid of a light beam passing through the sample. The moles of calcium per mole of material tested to give the first detectible turbidity, wherein the materials are compared on the same mole basis where a mole is that quantity of material equivalent to three moles of $P_2O_5$, was found to be as shown in the following table.

| Material | $\dfrac{Na_2O}{P_2O_5+SO_3}$ | Mole Calcium / Mole Material |
|---|---|---|
| Sodium tripolyphosphate | 1.67 | 3 |
| Graham Salt ($n=64$) | 1.00 | 3 |
| Sodium polyphosphatosulfate: | | |
| $5Na_2O:3P_2O_5:4.5SO_3$ | 0.67 | 13 |
| $5Na_2O:3P_2O_5:5SO_3$ | 0.63 | 14 |
| $6Na_2O:3P_2O_5:5SO_3$ | 0.75 | 27 |
| $6Na_2O:3P_2O_5:4SO_3$ | 0.86 | 80 |
| $3.3Na_2O:3P_2O_5:1SO_3$ | 0.83 | >80 |

Whereas the foregoing examples are directed to a demonstration of the deflocculation ability of various sodium polyphosphatosulfate compositions whereby the viscosity of various industrial slurries can be materially reduced, it is apparent that when it is desired to hold the viscosity of a slurry substantially constant the above data also clearly demonstrates that this can be done by increasing the solids content of the slurry. Accordingly, the sodium polyphosphatosulfate compositions can be employed as efficient deflocculants to either reduce the viscosity or increase the solids content of an industrial slurry as desired.

I claim:

1. A method of treating aqueous industrial mineral slurries comprising uniformly incorporating from about 0.005 to about 0.5 percent by weight of the slurry solids of an alkali metal polyphosphatosulfate composition, defined by the formula $xM_2O:yP_2O_5:zSO_3$, wherein M is an alkali metal selected from the group consisting of sodium and potassium, and $x$, $y$, and $z$ are integers, wherein the ratio of $x$ to the sum of $y$ plus $z$ is at least about 0.4 but less than one, to an aqueous mineral slurry, selected from the group consisting of raw cement slurries, clay slurries, pigment suspensions, and mineral-based paper-coating compositions, whereby a substantial increase in the fluidity of the said slurry is effected.

2. The method of claim 1, wherein the ratio of $x$ to the sum of $y$ plus $z$ is from about 0.55 to about 0.9.

3. The method of claim 2, wherein M is sodium.

4. The method of claim 3, wherein from about 0.05 to about 0.2 percent by weight of slurry solids of the sodium polyphosphatosulfate composition is incorporated.

5. A method of preparing a raw inorganic cement slurry in the wet process for the manufacture of cement which is suitable to form indurating masses when treated with water, comprising uniformly incorporating from about 0.05 to about 0.5 percent by weight of the raw inorganic cement slurry solids of an alkali metal polyphosphatosulfate composition, defined by the formula $xM_2O:yP_2O_5:zSO_3$, wherein M is an alkali metal selected from the group consisting of sodium and potassium, and $x$, $y$ and $z$ are integers, wherein the ratio of $x$ to the sum of $y$ plus $z$ is at least about 0.4 but less than one, to an aqueous raw inorganic cement slurry, whereby the solids content of the raw inorganic cement slurry is substantially increased while maintaining the fluidity substantially constant and within the pumpability limits of the wet-process equipment.

6. The method of claim 5, wherein the ratio of $x$ to the sum of $y$ plus $z$ is from about 0.55 to about 0.9.

7. The method of claim 6, wherein M is sodium.

8. The method of claim 7, wherein from about 0.05 to about 0.2 percent by weight of the raw inorganic cement slurry solids of the sodium polyphosphatosulfate composition is incorporated.

9. The method of claim 8, wherein the sodium polyphosphatosulfate composition is defined by the limits $5Na_2O:3P_2O_5:3SO_3$.

10. The method of claim 8, wherein the sodium polyphosphatosulfate composition is defined by the limits $4Na_2O:3P_2O_5:2SO_3$.

11. The method of claim 8, wherein the sodium polyphosphatosulfate composition is defined by the limits $6Na_2O:3P_2O_5:4SO_3$.

12. The method of claim 8, wherein the sodium polyphosphatosulfate composition is defined by the limits $4Na_2O:3P_2O_5:3SO_3$.

13. The method of claim 8, wherein the sodium polyphosphatosulfate composition is defined by the limits $5Na_2O:3P_2O_5:4SO_3$.

14. A method of treating aqueous clay slurry compositions comprising uniformly incorporating from about 0.05 to about 0.5 percent by weight of the clay solids of an alkali metal polyphosphatosulfate composition, defined by the formula $xM_2O:yP_2O_5:zSO_3$, wherein M is an alkali metal selected from the group consisting of sodium and potassium, and $x$, $y$ and $z$ are integers wherein the ratio of $x$ to the sum of $y$ plus $z$ is at least about 0.4, but less than one, to an aqueous clay slurry composition whereby a substantial increase in the fluidity of the said slurry is effected.

15. The method of claim 14, wherein the ratio of $x$ to the sum of $y$ plus $z$ is from about 0.55 to about 0.9.

16. The method of claim 15, wherein M is sodium.

17. The method of claim 16, wherein from about 0.05 to about 0.3 percent by weight of the clay slurry solids of the sodium polyphosphatosulfate composition is incorporated.

18. The method of claim 17, wherein the sodium polyphosphatosulfate composition is defined by the limits $4Na_2O:3P_2O_5:2SO_3$.

19. The method of claim 17, wherein the sodium polyphosphatosulfate composition is defined by the limits $4Na_2O:3P_2O_5:3SO_3$.

References Cited in the file of this patent

UNITED STATES PATENTS

| | | |
|---|---|---|
| 2,587,044 | Heilmann | Feb. 26, 1952 |
| 2,709,661 | Dietz | May 31, 1955 |

FOREIGN PATENTS

| | | |
|---|---|---|
| 737,551 | Great Britain | Sept. 28, 1955 |